(12) United States Patent
Cho

(10) Patent No.: US 8,497,965 B2
(45) Date of Patent: Jul. 30, 2013

(54) ARRAY SUBSTRATE OF LIQUID CRYSTAL DISPLAY AND METHOD OF MANUFACTURING THE ARRAY SUBSTRATE

(75) Inventor: Youngjoon Cho, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 850 days.

(21) Appl. No.: 12/249,827

(22) Filed: Oct. 10, 2008

(65) Prior Publication Data

US 2009/0135117 A1    May 28, 2009

(30) Foreign Application Priority Data

Nov. 26, 2007  (KR) .................. 10-2007-0120962

(51) Int. Cl.
*G02F 1/1343* (2006.01)
*G02F 1/1337* (2006.01)

(52) U.S. Cl.
USPC ........................ 349/141; 349/129; 349/139

(58) Field of Classification Search
USPC .................. 349/141, 129, 139, 146
See application file for complete search history.

(56) References Cited

U.S. PATENT DOCUMENTS

| | | | | |
|---|---|---|---|---|
| 7,023,516 | B2* | 4/2006 | Yoshida et al. | 349/143 |
| 8,432,522 | B2* | 4/2013 | Mori et al. | 349/141 |
| 2006/0146252 | A1* | 7/2006 | Kang et al. | 349/141 |
| 2006/0244888 | A1* | 11/2006 | Ohta et al. | 349/141 |
| 2007/0146591 | A1* | 6/2007 | Kimura et al. | 349/114 |
| 2007/0153204 | A1* | 7/2007 | Kim et al. | 349/141 |
| 2007/0242203 | A1* | 10/2007 | Lee et al. | 349/141 |
| 2007/0296901 | A1* | 12/2007 | Seo et al. | 349/141 |
| 2008/0068549 | A1* | 3/2008 | Liao et al. | 349/141 |
| 2008/0136990 | A1* | 6/2008 | Kimura | 349/46 |
| 2011/0121307 | A1* | 5/2011 | Kimura et al. | 257/66 |

FOREIGN PATENT DOCUMENTS

| | | |
|---|---|---|
| JP | 2005148738 | 6/2005 |
| KR | 1020070036866 | 4/2007 |
| KR | 100724957 | 5/2007 |

* cited by examiner

*Primary Examiner* — Nathanael R Briggs
(74) *Attorney, Agent, or Firm* — H.C. Park & Associates, PLC

(57) ABSTRACT

An array substrate of a liquid crystal display (LCD) device and a method of manufacturing the array substrate area disclosed. An array substrate of an LCD device includes an insulation substrate, a gate line, a data line, a thin film transistor connected to the gate line and the data line, a common electrode disposed at a pixel area, a pixel electrode overlapping with the common electrode, and a common line. The common line is connected to the common electrode and overlaps with a gap between the common electrode and the data line.

28 Claims, 16 Drawing Sheets

222

222

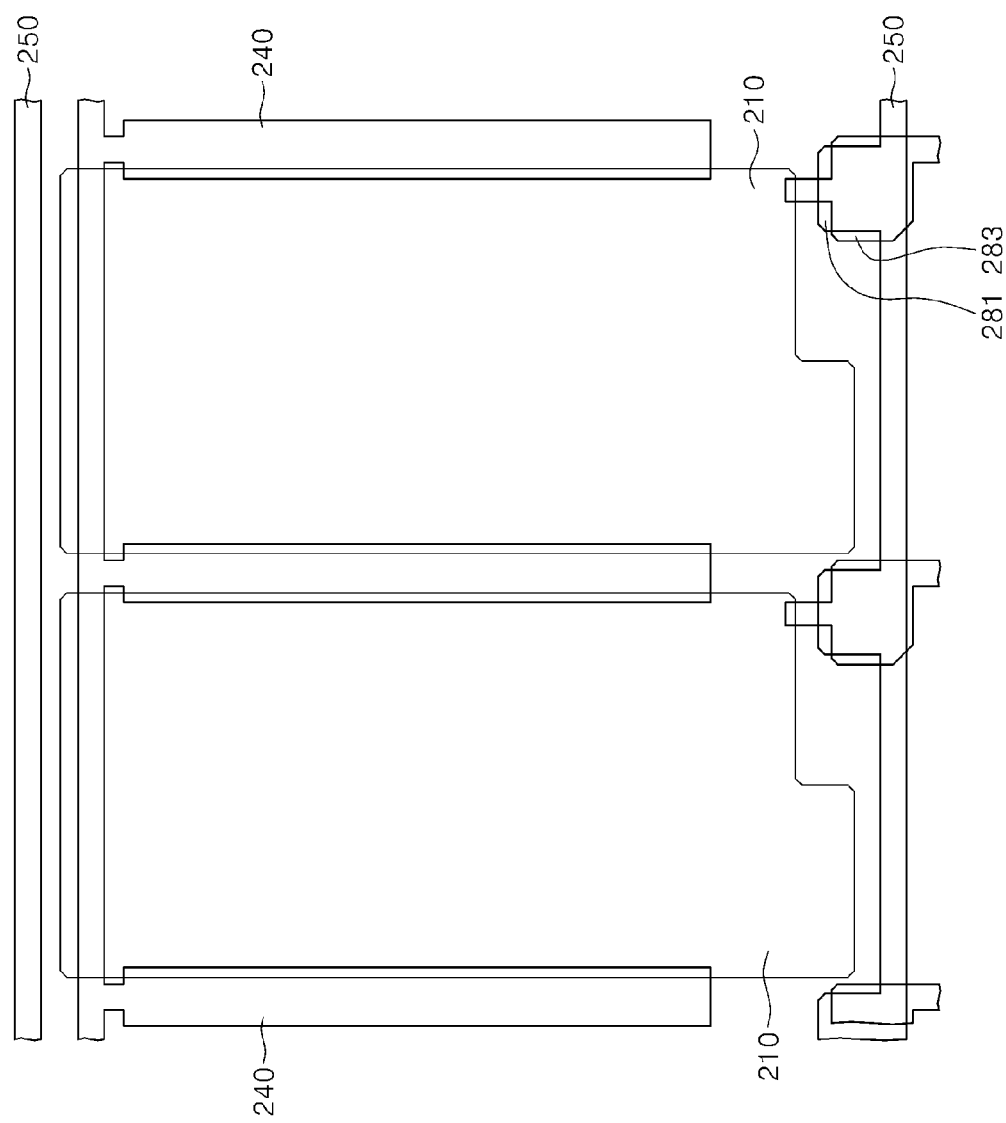

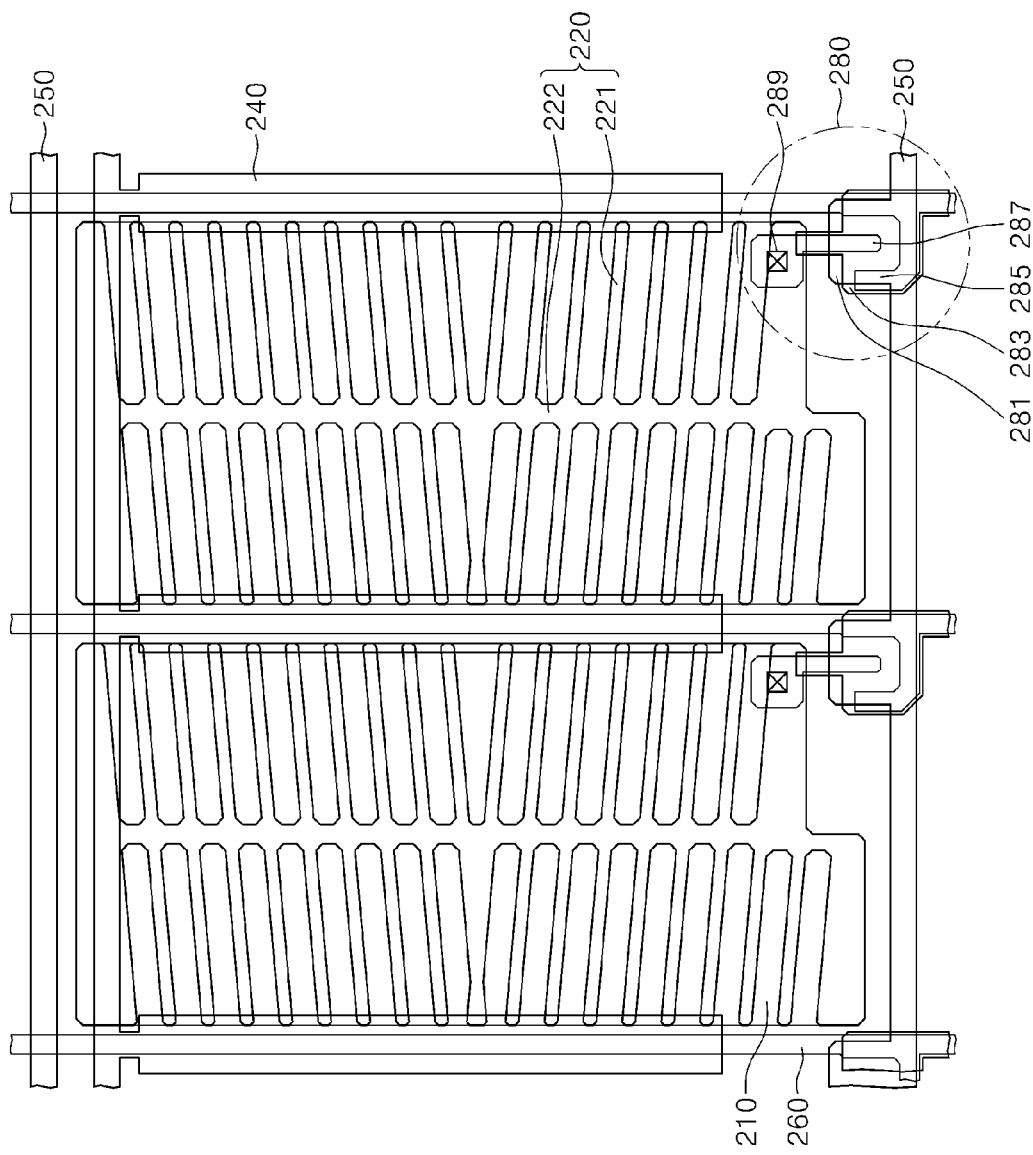

ARRAY SUBSTRATE OF LIQUID CRYSTAL DISPLAY AND METHOD OF MANUFACTURING THE ARRAY SUBSTRATE

CROSS-REFERENCE TO RELATED APPLICATIONS

This application claims priority from and the benefit of Korean Patent Application No. 10-2007-0120962, filed on Nov. 26, 2007, which is hereby incorporated by reference for all purposes as if fully set forth herein.

BACKGROUND OF THE INVENTION

1. Field of the Invention

The present invention relates to an array substrate of a liquid crystal display ("LCD") device and a method of manufacturing the array substrate. More particularly, the present invention relates to an array substrate of an LCD device without a black matrix and a method of manufacturing the array substrate.

2. Discussion of the Background

Recently, in information society, a demand for a display device with high performance for displaying images, graphics, texts, and so on has greatly increased in order to deliver various kind of information promptly. Therefore, the display industry has grown in recent years.

An LCD consumes less power, is easily down-sized, and does not emit harmful electromagnetic waves. LCD technology has progressed in recent years, and LCDs are now used for electric watches, electric calculators, personal computers, televisions, and so on.

An LCD device includes two substrates and liquid crystals interposed between the two substrates. Pixel electrodes and a common electrode may be disposed on the two substrates, respectively, to form an electric field. The electric field alters the alignment of liquid crystal molecules and adjusts light transmissivity, so that an image may be displayed.

SUMMARY OF THE INVENTION

The present invention provides an array substrate without a black matrix that may have reduced manufacturing costs and a simplified manufacturing process.

The present invention also provides a method of manufacturing the array substrate.

Additional features of the invention will be set forth in the description which follows, and in part will be apparent from the description, or may be learned by practice of the invention.

The present invention discloses an array substrate of an LCD device including an insulation substrate, a gate line, a data line, a thin film transistor connected to the gate line and the data line, a common electrode disposed in a pixel area, a pixel electrode overlapping with the common electrode, and a common line. The common line is connected to the common electrode and overlaps with a gap between the common electrode and the data line.

The present invention also discloses a method of manufacturing an array substrate of a liquid crystal display device including forming a common electrode at each of a plurality of pixel areas of an insulation substrate, forming a first metallic pattern including a gate line, a gate electrode, and a common line, the common line connected to the common electrode and covering a lateral gap between the common electrode and an adjacent common electrode, forming a gate insulation layer on the first metallic pattern, forming an activation layer on the gate insulation layer to overlap with the gate electrode, forming a second metallic pattern including a data line overlapping with the common line and a source electrode and a drain electrode separated from each other on the activation layer, forming a protective layer on the second metallic pattern, and forming a pixel electrode on the protective layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8A, FIG. 8B, FIG. 8C, FIG. 8D, and FIG. 8E are plan views showing a method of manufacturing a liquid crystal display device according to the first exemplary embodiment of the present invention.

DETAILED DESCRIPTION OF THE ILLUSTRATED EMBODIMENTS

Figure 1:
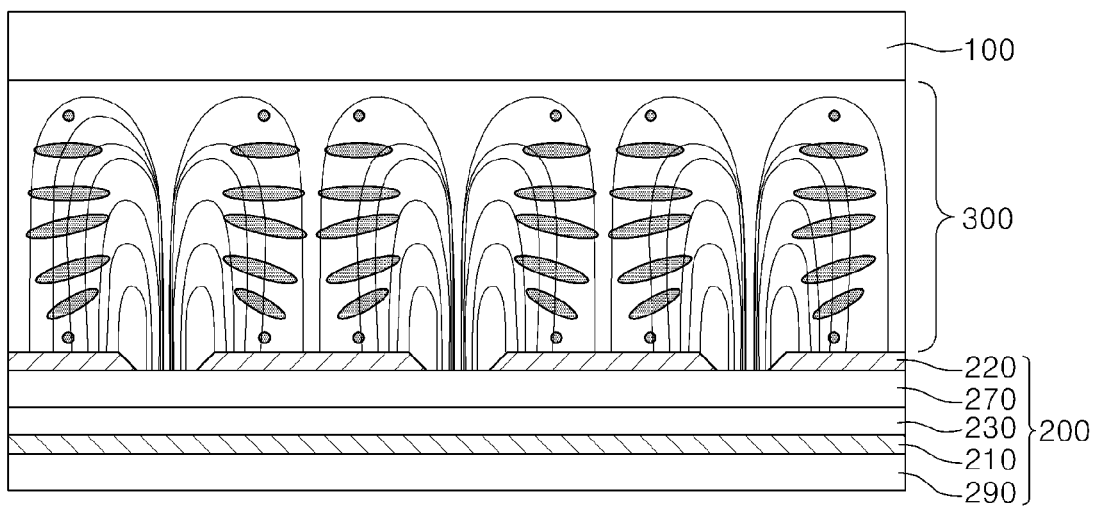
FIG. 1 is a cross-sectional view showing an in-plane-switching liquid crystal display device.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a cross-sectional view showing an in-plane-switching (IPS) type liquid crystal display (LCD) device.

The IPS type LCD device in FIG. 1 includes a color filter substrate 100, an array substrate 200, and a liquid crystal layer 300 interposed between the two substrates 100 and 200.

The array substrate 200 includes a thin film transistor (TFT) and a common electrode 210 and a pixel electrode 220 at each of a plurality of pixel areas defined on a transparent insulation substrate 290.

The TFT includes a gate electrode, an activation layer, a source electrode, and a drain electrode. The activation layer is disposed on the gate electrode, and an insulation layer is interposed between the gate electrode and the activation layer. The source electrode and the drain electrode are spaced apart from each other on the activation layer.

The insulation layer 230 and the protective layer 270 are disposed between the common electrode 210 and the pixel electrode 220. A vertical electric field formed between the common electrode 210 and the pixel electrode 220 adjusts the alignment of liquid crystals of the liquid crystal layer 300 to control light transmissivity.

The color filter substrate 100 includes color filters corresponding to the pixel area on the transparent insulation substrate and a black matrix to prevent light leakage.

Such an IPS type LCD device has a more excellent viewing angle and higher transmissivity than a vertical alignment (VA) type LCD device.

Figure 2:
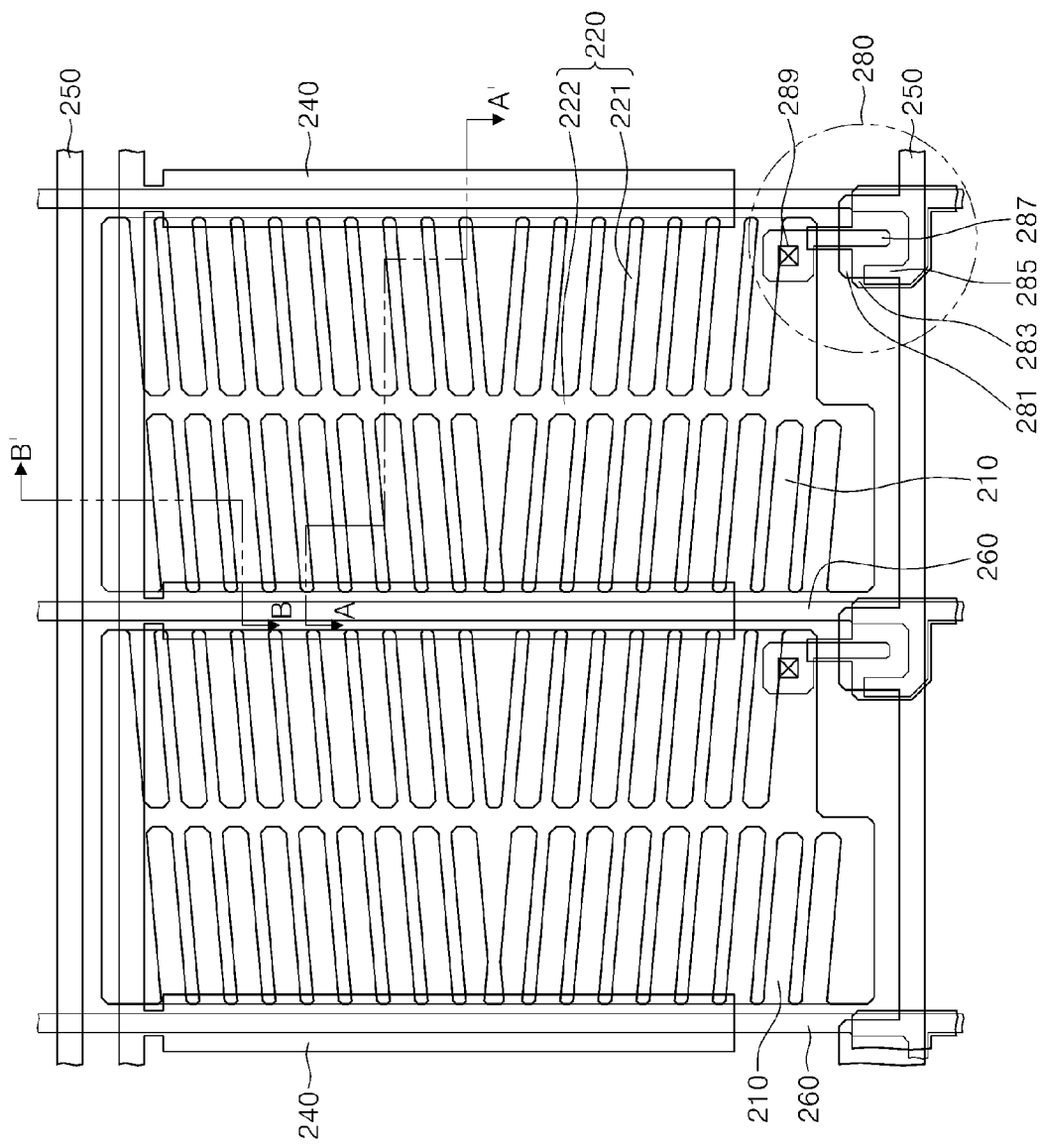
FIG. 2 is a plain view showing an array substrate according to a first exemplary embodiment of the present invention.
Figure 3:
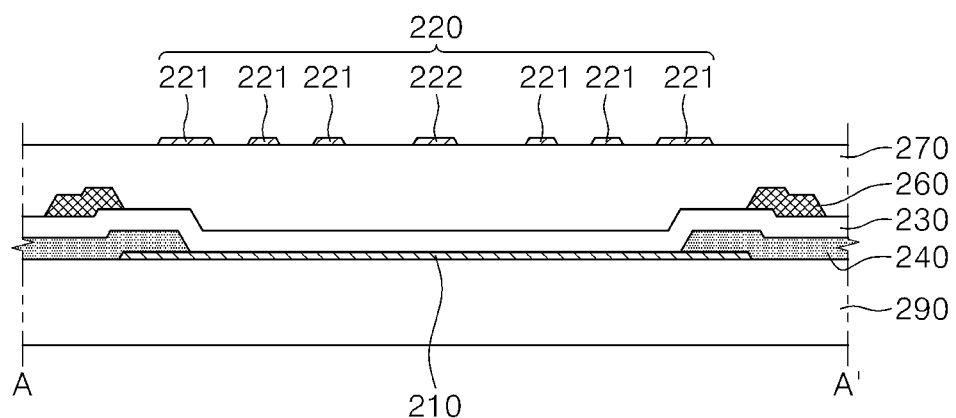
FIG. 3 is a cross-sectional view of the array substrate in FIG. 2 taken along line A-A'.
Figure 4:
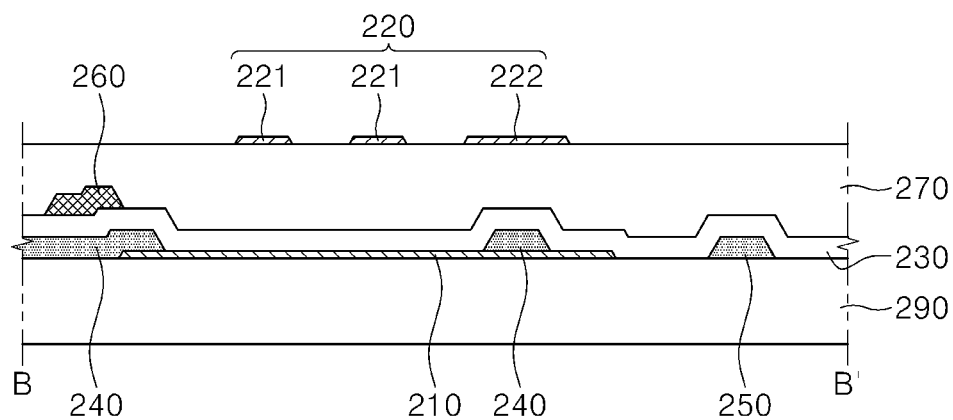
FIG. 4 is a cross-sectional view of the array substrate in FIG. 2 taken along line B-B'.
Figure 5:
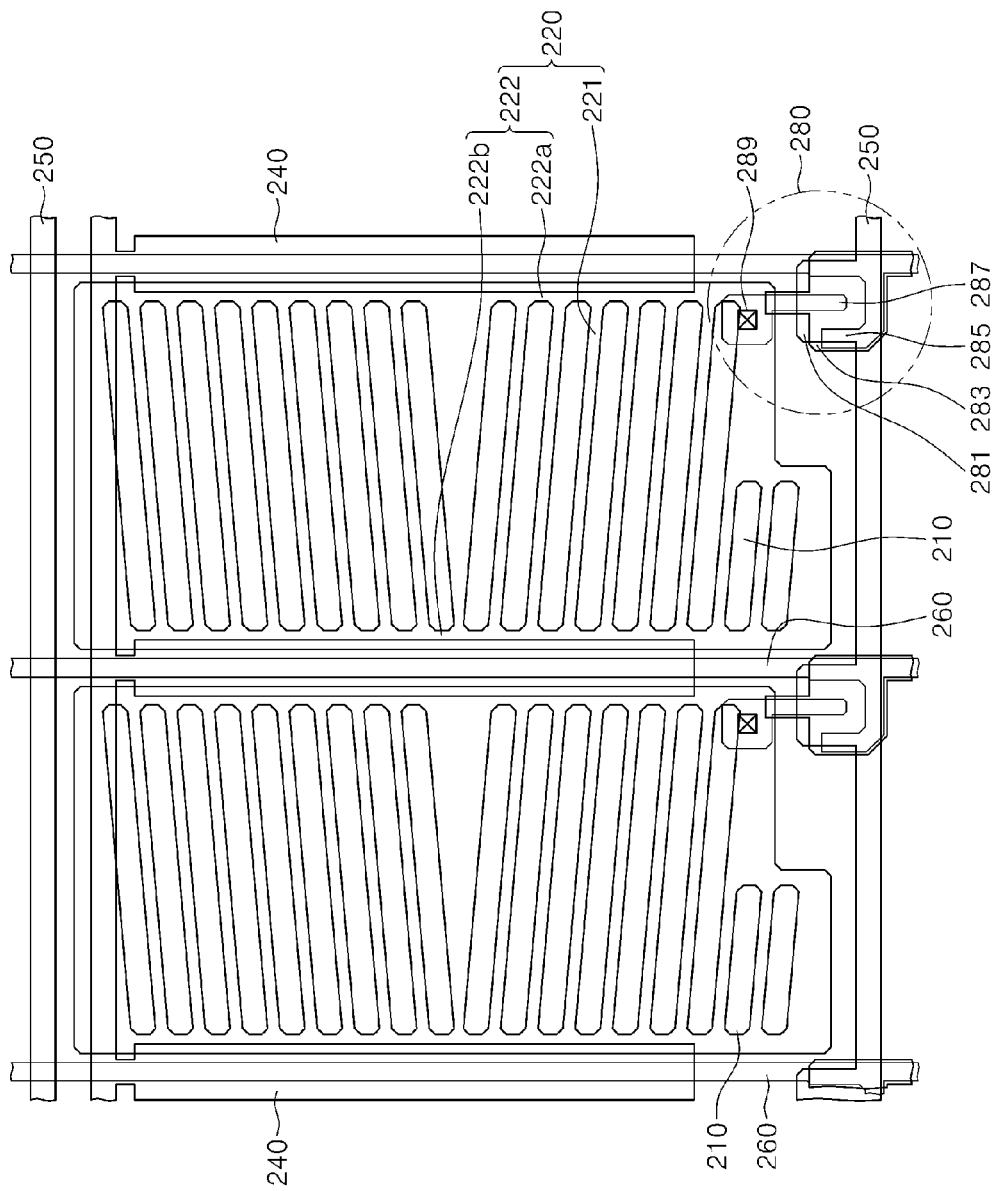
FIG. 5 is a plain view showing a pixel electrode of a conventional in-plane-switching liquid crystal display device.

FIG. 2 is a plain view showing an array substrate according to a first exemplary embodiment of the present invention. FIG. 3 is a cross-sectional view of the array substrate in FIG. 2 taken along line A-A'. FIG. 4 is a cross-sectional view of the array substrate in FIG. 2 taken along line B-B'. FIG. 5 is a plain view showing a pixel electrode of a conventional in-plane-switching LCD device.

An array substrate according to the present exemplary embodiment of the present invention includes a gate line 250, a data line 260, a TFT 280, a common electrode 210, a pixel electrode 220, and a common line 240.

The gate line 250 and the data line 260 cross each other on the transparent substrate 290 and define a pixel area. The gate line 250 is connected to a gate electrode 281 of the TFT 280, and applies a gate voltage signal to the gate electrode 281. The data line 260 applies a pixel voltage signal to a source electrode 285 of the TFT 280. The gate line 250 and the data line 260 may include a metal material and may be a single layer or multiple layers. The gate line 250 and the data line 260 may include molybdenum (Mo), niobium (Nb), copper (Cu), aluminum (Al), chrome (Cr), silver (Ag), tungsten (W), or an alloy thereof.

The common electrode 210 may have a plate shape and is disposed at a pixel area defined by the gate line 250 and the data line 260. The common electrode may include transparent conductive materials, such as indium tin oxide (ITO), tin oxide (TO), indium zinc oxide (IZO), indium tin zinc oxide (ITZO), and so on.

The common line 240 is connected to the common electrode 210 and applies a common voltage to the common electrode 210. For example, the common line 240 may include molybdenum (Mo), niobium (Nb), copper (Cu), aluminum (Al), chrome (Cr), silver (Ag), tungsten (W), or an alloy thereof.

As shown in FIG. 2, FIG. 3, and FIG. 4, the common line 240 covers a lateral gap between adjacent common electrodes 210, and overlaps with a gap between each common electrode 210 and the data line 260. Because the common line 240 overlaps with the gap between the common electrode 210 and the data line 260, light leakage at the gap may be prevented without a black matrix. When such a structure of the common line 240 is applied, the manufacturing process may be simplified and the manufacturing cost may be reduced.

The common line 240 overlaps with the pixel electrode 220, and the insulation layer 230 and the protective layer 270 are disposed between the common line 240 and the pixel electrode 220, thereby forming a reservoir capacitor Cst. Normally an edge of the reservoir capacitor Cst is interfered with by a voltage swing of the data line 260. The common line 240, which may include a metallic material, is disposed between the data line 260 and the pixel electrode 220, so that the interference caused by the voltage swing may be prevented. Thus, a gap between the pixel electrode 220 and the data line 260 may be narrower, thereby improving the opening ratio.

In general, liquid crystals at edges of the pixel electrode 220 are not controlled easily, and a black matrix covering the edges of the pixel electrode 220 is used to prevent distortion of images. According to the present exemplary embodiment, the common line 240 overlaps with an edge of the pixel electrode 220. The common line 240 may be disposed closer to the pixel electrode 220 than a black matrix, and thus, a sufficient effect may be obtained even if an area overlapping with the pixel electrode 220 is smaller than that with the black matrix. Thus, the opening ratio may be improved.

The pixel electrode 220 overlaps with the common electrode 210, and the insulation layer 230 is disposed between pixel electrode 220 and the common electrode 210 at a pixel area. A vertical electric field is formed between the pixel electrode 220 and the common electrode 210, and drives liquid crystals of the liquid crystal layer 300. For example, the pixel electrode 220 may include a transparent conductive material, such as ITO, TO, IZO, ITZO, and so on. The pixel electrode 220 includes horizontal parts 221 having stripe shapes and vertical parts 222 connecting the horizontal parts 221. The horizontal parts 221 may be inclined at about 0 to about 45 degrees with respect to the gate line 250.

The vertical parts 222 cross the horizontal parts 221 and connect the horizontal parts 221. The vertical parts 222 connect central portions of the horizontal parts 221. As shown in FIG. 5, in the conventional pixel electrode 220, a first vertical part group 222a connects end portions of first sides of the horizontal parts 221, and a second vertical part group 222b connects end portions of second sides of the horizontal parts 221. However, light is blocked in the region of the vertical parts 222 and in areas adjacent to the vertical parts 222 in the conventional pixel electrode, even when a white image is displayed. Both end portions of the pixel electrode 220 having the vertical parts 222 in the conventional pixel electrode 220 lose light transmissivity. On the other hand, a pixel electrode 220 having a structure of vertical parts 222 minimizes areas at which light is not transmitted in the array substrate due to the vertical parts 222, so that light transmissivity may be maximized.

Figure 6A:
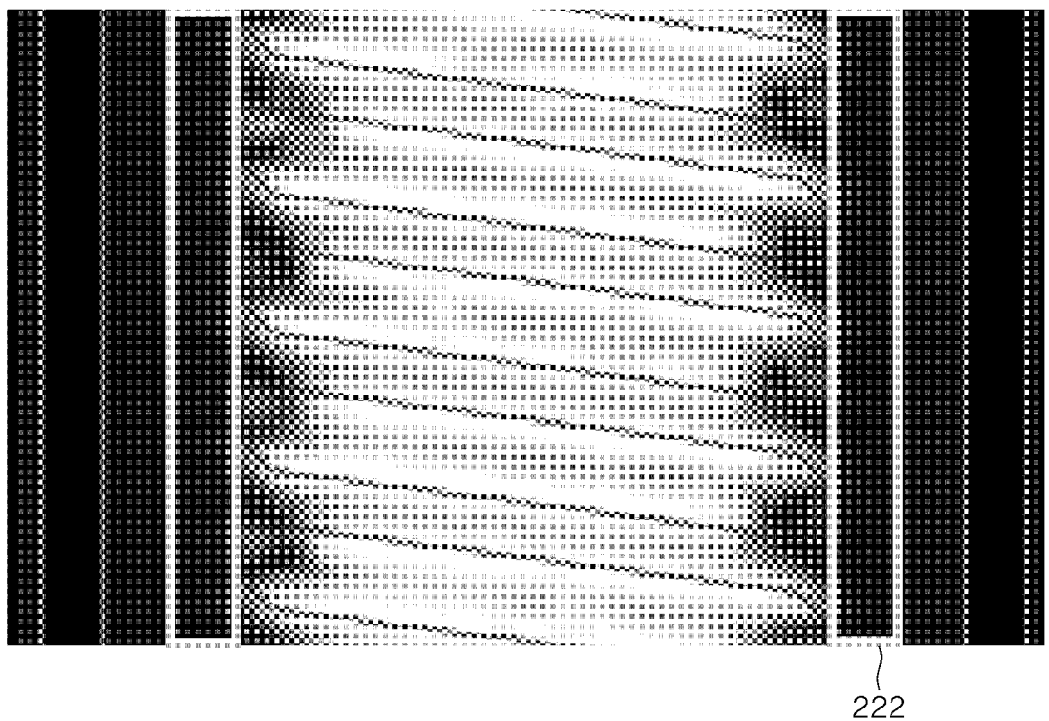
FIG. 6A is a plan view showing a light transmitting area of a conventional liquid crystal display device using the pixel electrode in FIG. 5.
Figure 6B:
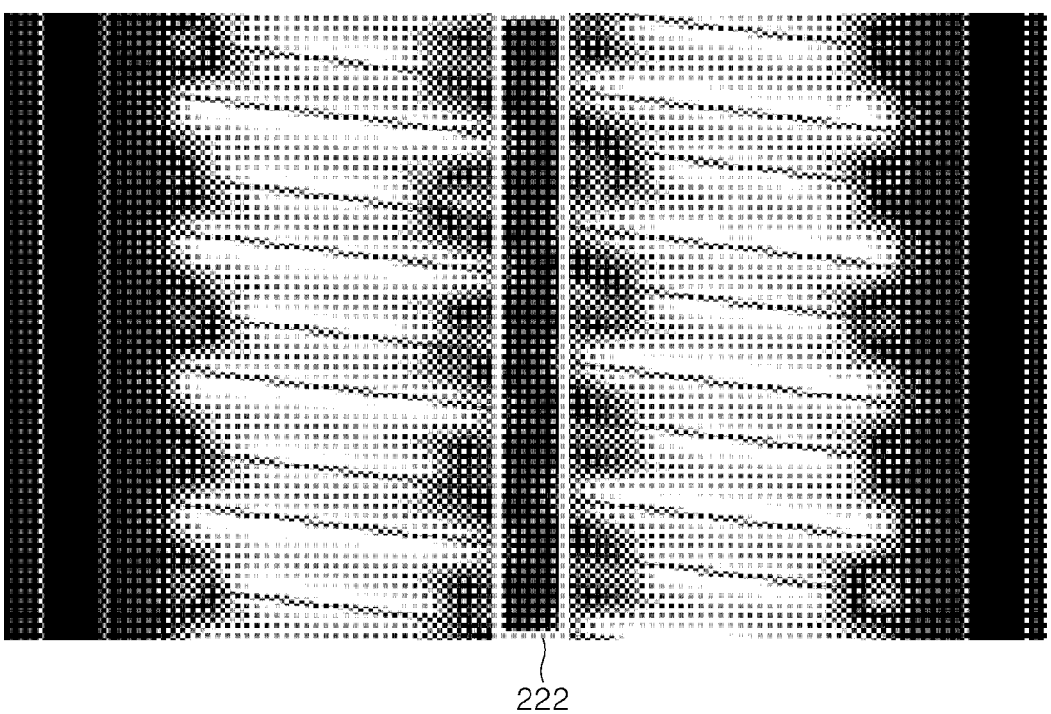
FIG. 6B is a plan view showing a light transmitting area of the liquid crystal display device in accordance with the first exemplary embodiment of the present invention shown in FIG. 2.

FIG. 6A is a plan view showing a light transmitting area of a conventional LCD device using the pixel electrode shown in FIG. 5. FIG. 6B is a plan view showing a light transmitting area of the LCD device according to the first exemplary embodiment of the present invention shown in FIG. 2. Entire lines of end portions of the vertical parts 222 are dark in FIG. 6A, and only lines at which the vertical parts 222 are formed at a center of the pixel area are dark in FIG. 6B. Thus, light transmissivity may be greater when the electrode structure of FIG. 2 is applied than when the conventional electrode structure of FIG. 5 is applied.

Figure 7A:
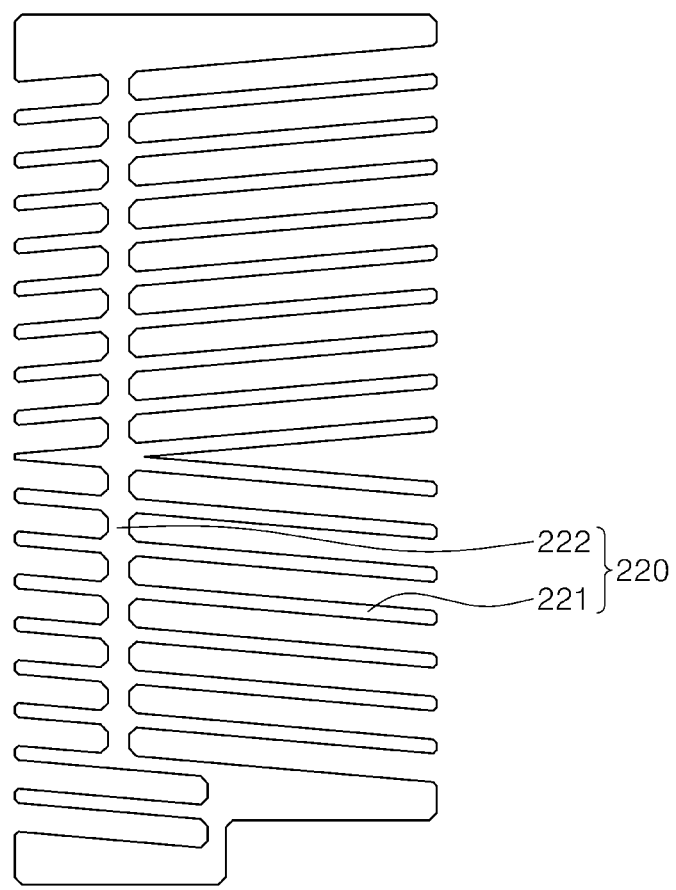
FIG. 7A is a plan view showing a pixel electrode according to a second exemplary embodiment of the present invention.
Figure 7B:
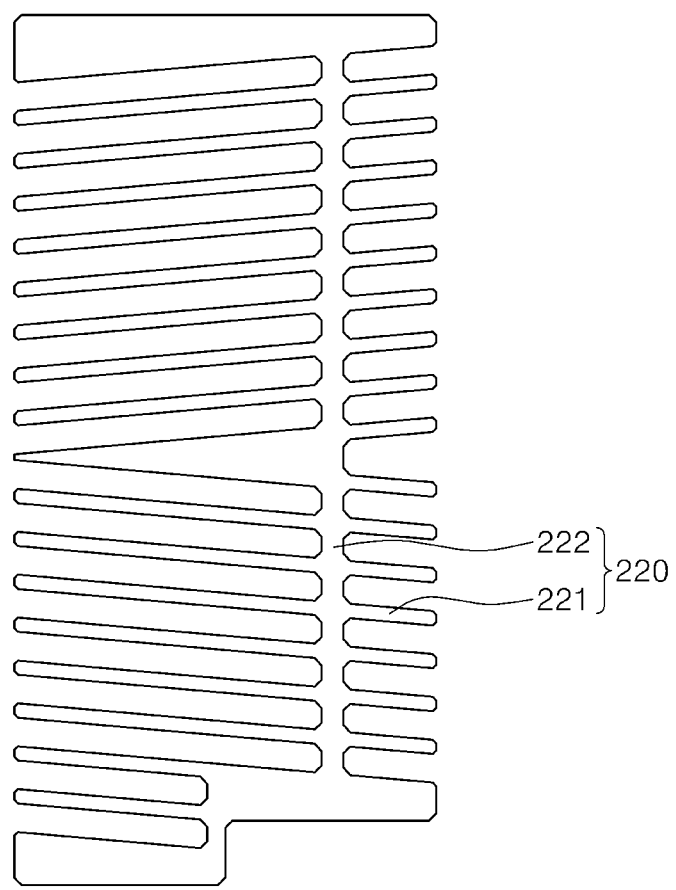
FIG. 7B is a plan view showing a pixel electrode according to a third exemplary embodiment of the present invention.
Figure 7C:
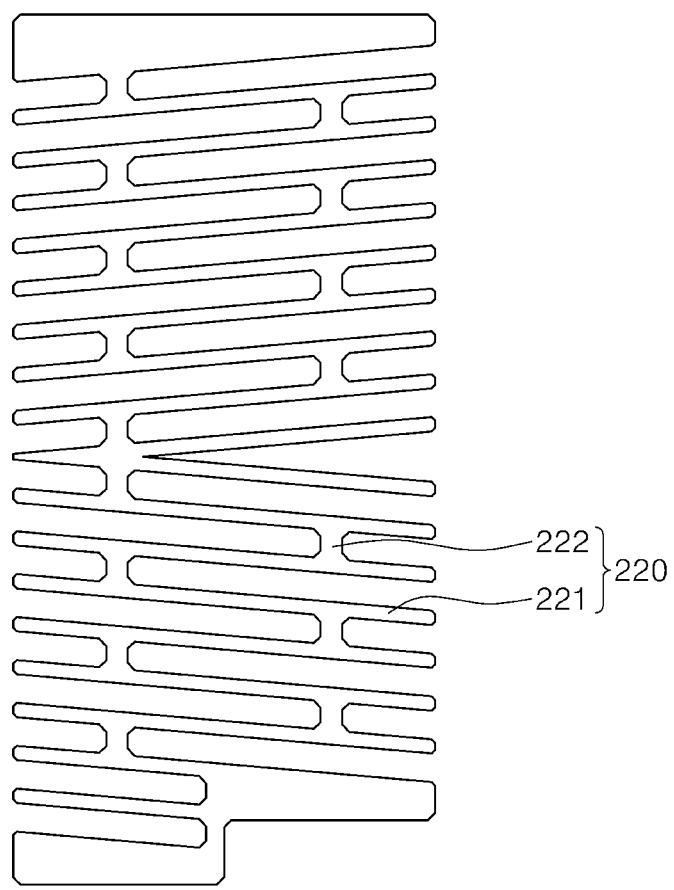
FIG. 7C is a plan view showing a pixel electrode according to a fourth exemplary embodiment of the present invention.
Figure 7D:
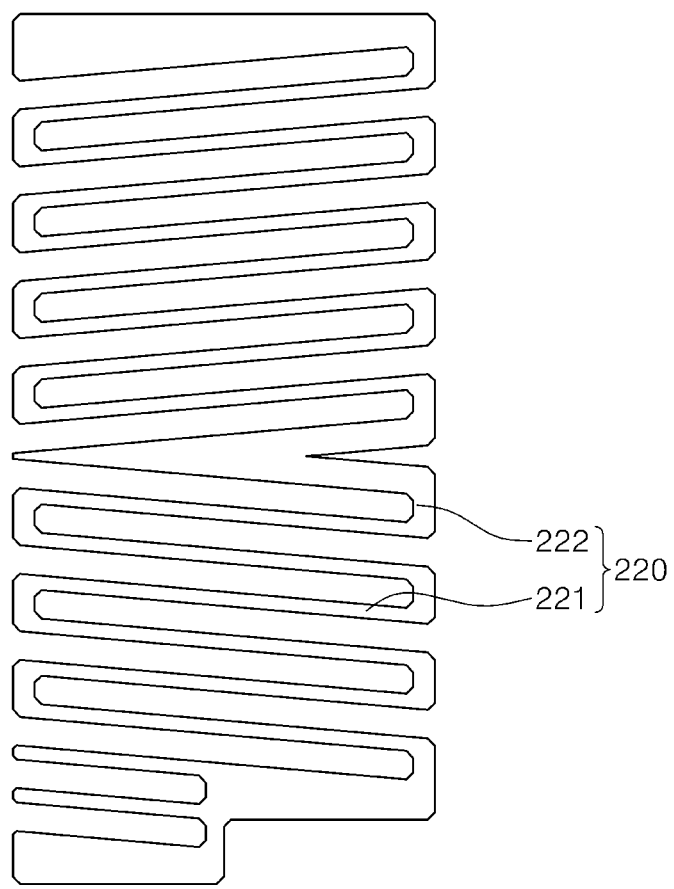
FIG. 7D is a plan view showing a pixel electrode according to a fifth exemplary embodiment of the present invention.
Figure 7E:
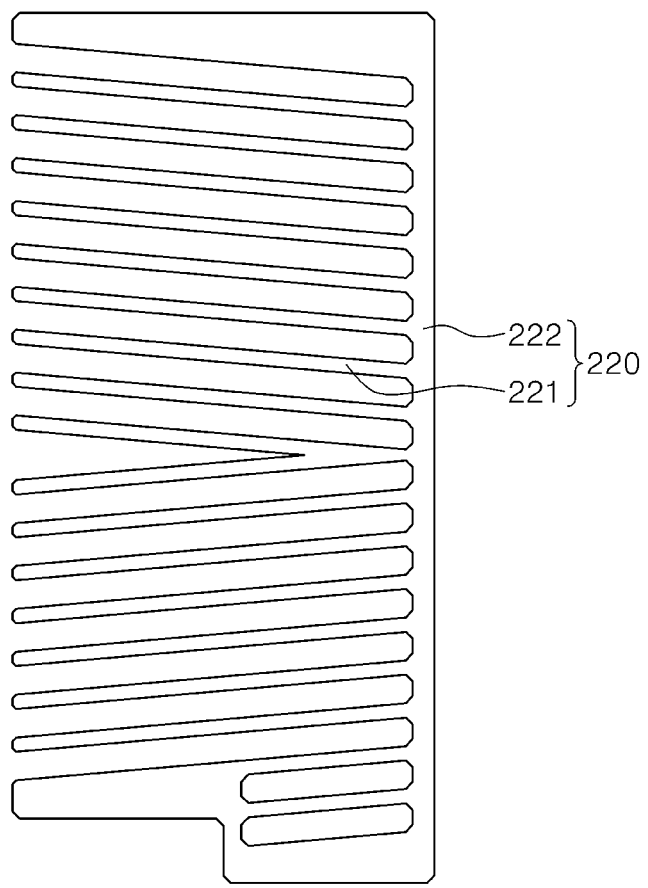
FIG. 7E is a plan view showing a pixel electrode according to a sixth exemplary embodiment of the present invention.
Figure 7F:
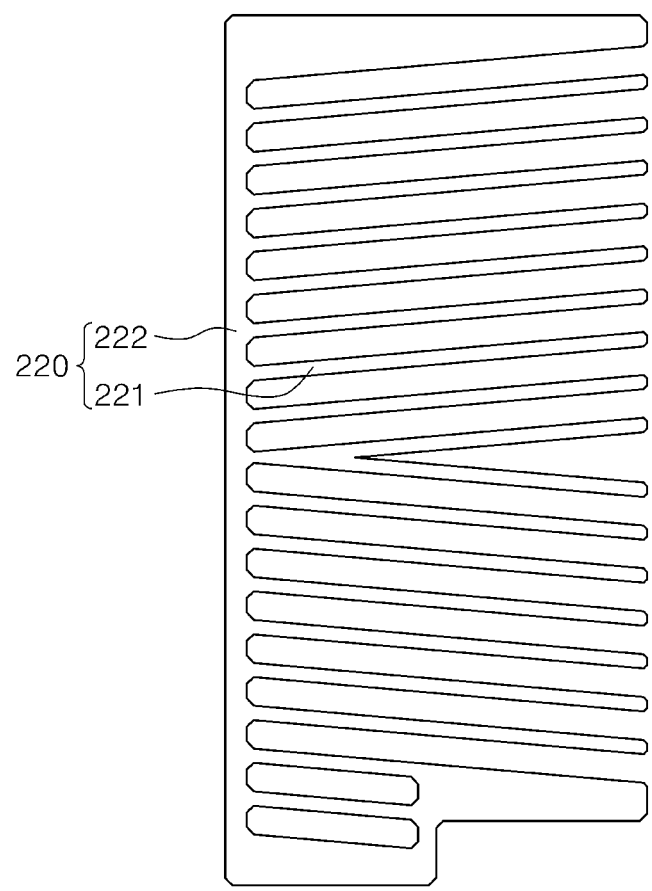
FIG. 7F is a plan view showing a pixel electrode according to a seventh exemplary embodiment of the present invention.

The vertical parts 222 of the pixel electrode in the present exemplary embodiment cross the horizontal parts 221 and are disposed straightly at a center of the pixel electrode. The vertical parts 222 may have different shapes. Examples of structures of the pixel electrode 220 that may improve light transmissivity are shown in FIG. 7A and FIG. 7B. An example of a structure of the vertical parts 222 crossing the horizontal parts 221 and linking central portions of the horizontal parts 221, the vertical parts 220 shifting back and forth from left to right sequentially is shown in FIG. 7C. An example of a structure of the vertical parts 222 linking end portions of the horizontal parts 221 and shifting back and forth from left to right sequentially is shown in FIG. 7D. Examples of structures of the vertical parts 222 crossing the horizontal parts 221 and disposed straightly at a side of the pixel electrodes 220 are shown in FIGS. 7E and 7F respectively.

The TFT 280 may include a metallic material and may be a single layer or multiple layers. The TFT 280 may include molybdenum (Mo), niobium (Nb), copper (Cu), aluminum (Al), chrome (Cr), silver (Ag), tungsten (W), or an alloy thereof.

The insulation layer 230 is disposed between the gate electrode 281 and the activation layer 283 to insulate the gate electrode 281 from the activation layer 283 and may include an inorganic insulation material, such as silicon oxide ($SiO_x$), silicon nitride ($SiN_x$), and so on.

The activation layer 283 overlaps with the gate electrode 281 and the insulation layer 230 is disposed between the activation layer 283 and the gate electrode 281, thereby forming a channel between the source electrode 285 and the drain electrode 287. For example, the activation layer 283 may include amorphous silicon. An ohmic contact layer may be disposed on the activation layer 283 to reduce resistance with the source electrode 285 and the drain electrode 287. The ohmic contact layer may include amorphous silicon implanted with impurities.

The source electrode 285 is connected to the data line 260 and transfers a pixel voltage signal to the drain electrode 287 through the activation layer 283. The drain electrode 287 transfers the received pixel voltage signal to the pixel electrode 220. The source electrode 285 and the drain electrode 287 may include a metallic material and may be a single layer or multiple layers. The source electrode 285 and the drain electrode 287 may include molybdenum (Mo), niobium (Nb), copper (Cu), aluminum (Al), chrome (Cr), silver (Ag), tungsten (W), or an alloy thereof.

The protective layer 270 protects the TFT 280 and may include an organic insulation material or an inorganic insulation material, such as silicon oxide ($SiO_x$), silicon nitride ($SiN_x$), and so on. A contact hole 289 is formed in the protective layer 270 to expose the drain electrode 287, and the pixel electrode 220 is connected to the drain electrode 287 through the contact hole 289.

FIG. 8A, FIG. 8B, FIG. 8C, FIG. 8D, and FIG. 8E are plan views showing a method of manufacturing a liquid crystal display device according to the first exemplary embodiment of the present invention.

Figure 8A:
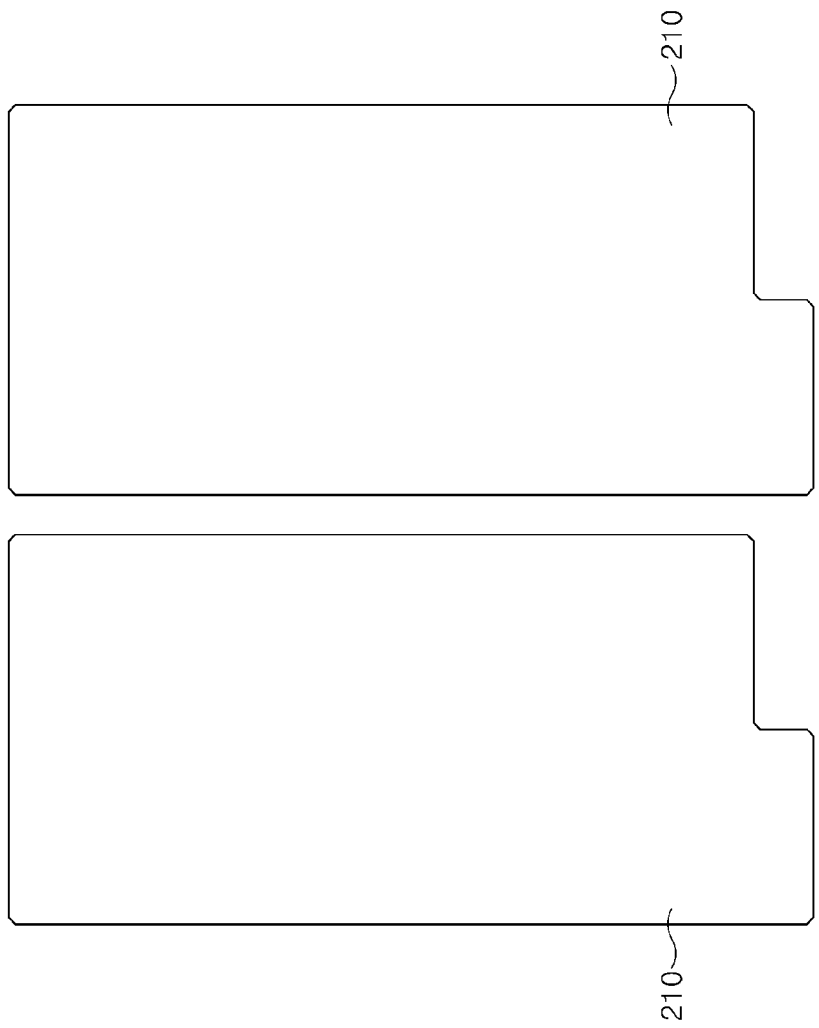

Referring to FIG. 8A, a common electrode 210 is formed at each of a plurality of pixel areas of an insulation layer 290. A transparent conductive material, such as ITO, TO, IZO, ITZO, and so on, may be deposited on the insulation layer 290 by deposition methods, such as a sputtering process, and the transparent conductive layer may be patterned by a photo-lithography process using a mask and an etching process to form a common electrode 210.

Figure 8B:
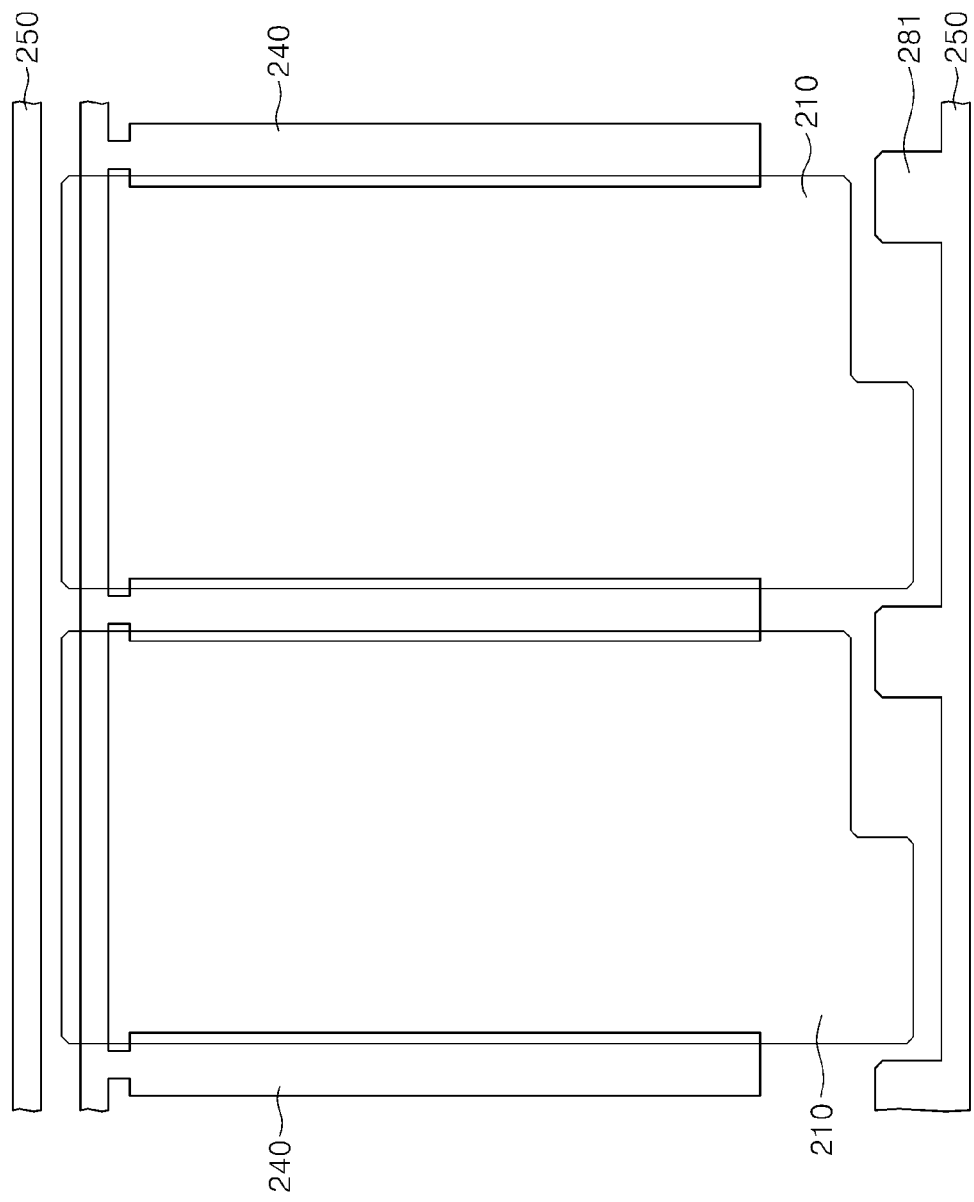

A first metallic pattern including a gate line 250, a gate electrode 281, and a common line 240 is formed as shown in FIG. 8B. A metallic material, such as molybdenum (Mo), niobium (Nb), copper (Cu), aluminum (Al), chrome (Cr), silver (Ag), tungsten (W), or an alloy thereof, may be deposited by a deposition method to form a single metallic layer or multiple metallic layers, and the metallic layer may be patterned by a photo-lithography process using a mask and an etching process to form a first metallic pattern. The gate electrode 281 protrudes from the gate line 250, and the common line 240 contacts the common electrode 210, and covers a lateral gap between the common electrode 210 and an adjacent common electrode.

An insulation layer 230 is formed on the first metallic pattern. An inorganic insulation material, such as silicon oxide ($SiO_x$), silicon nitride ($SiN_x$), and so on, may be deposited by deposition methods, such as a plasma enhanced chemical vapor deposition (PECVD), to form the insulation layer 230.

An activation layer 283 is formed on the insulation layer 230 to overlap with the gate electrode 281, as shown in FIG. 8C. An ohmic contact layer may be formed on the activation layer 283. For example, an amorphous silicon layer and an amorphous silicon layer implanted with impurities may be deposited sequentially by deposition methods, such as PECVD, and may be patterned by a photo-lithography process and an etching process using a mask to form the activation layer 283 and the ohmic contact layer.

Figure 8D:
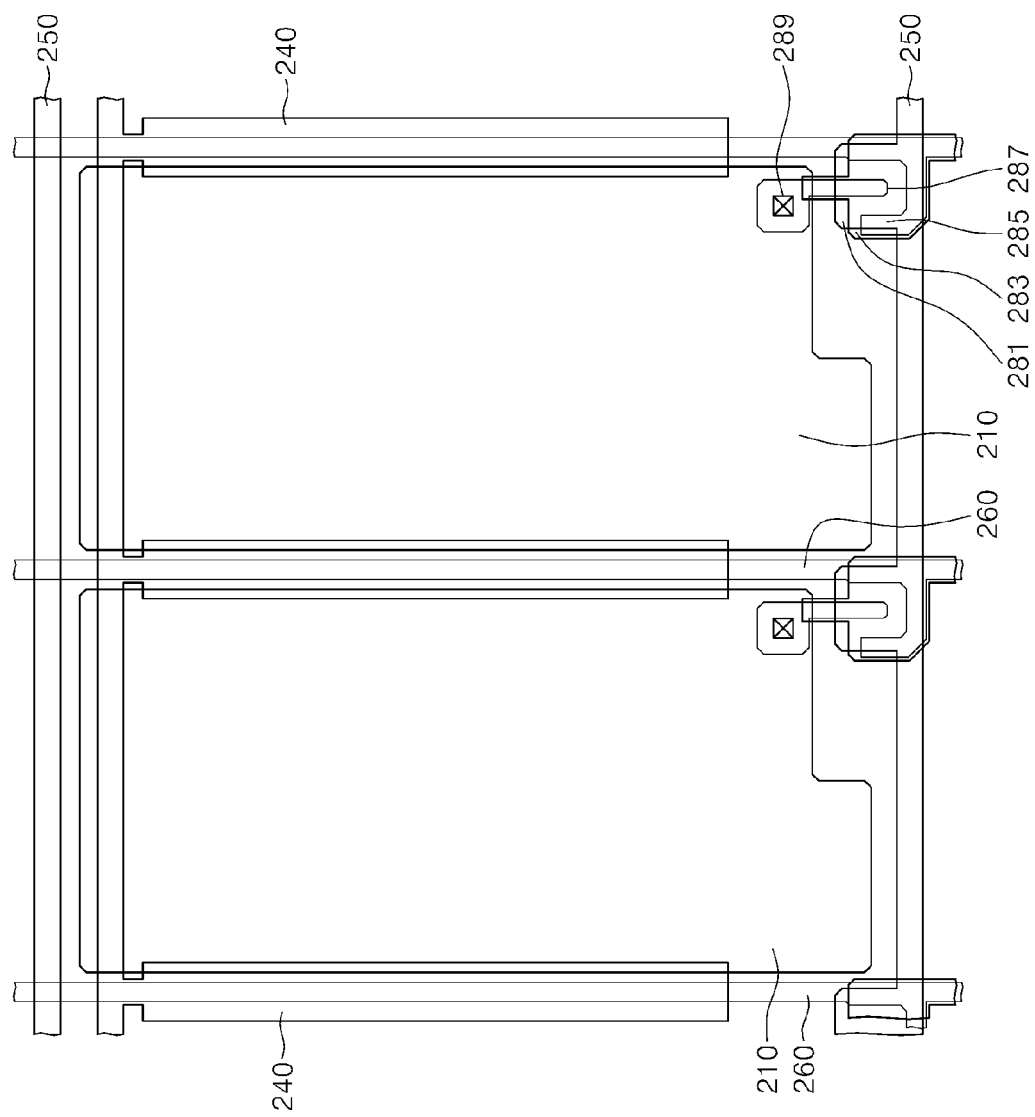

A second metallic pattern including a data line 260 overlapping with the common line 240 and a source electrode 285 and a drain electrode 287 formed separately from each other is formed on the activation layer 283 as shown in FIG. 8D. A metallic material, such as molybdenum (Mo), niobium (Nb), copper (Cu), aluminum (Al), chrome (Cr), silver (Ag), tungsten (W), or an alloy thereof, may be deposited by a deposition method to form a single metallic layer or multiple metallic layers, and the metallic layer may be patterned by a photo-lithography process and an etching process using a mask to form a second metallic pattern.

A protective layer 270 is formed on the second metallic pattern. Inorganic insulation material or organic insulation material may be deposited by methods, such as PECVD, and patterned by a photo-lithography process and an etching process using a mask to form the protective layer 270.

A pixel electrode 220 is formed on the protective layer, as shown in FIG. 8E. A transparent conductive material, such as ITO, TO, IZO, or ITZO, may be deposited on the substrate by a method, such as a sputtering process, to form a transparent conductive layer, and may be patterned by a photo-lithography process and an etching process using a mask to form the pixel electrode 220.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate of a liquid crystal display device, comprising:
    a plurality of pixel areas;
    an insulation substrate;
    a gate line extending in a first direction;
    a data line;
    a thin film transistor connected to the gate line and the data line;
    a common electrode disposed at each of the plurality of pixel areas;
    a pixel electrode overlapping with the common electrode; and
    a common line connected to the common electrode and comprising a portion extended along a lateral gap between the common electrodes adjacent to each other in the first direction when viewed perpendicular to the insulation substrate from above and covering the lateral gap between the common electrodes adjacent to each other in the first direction,
    wherein the extended portion of the common line completely overlaps with the data line and a gap between each common electrode and the data line in the first direction when viewed perpendicular to the insulation substrate from above.

2. The array substrate of claim 1, wherein the common electrode has a plate shape, and
    wherein the pixel electrode comprises horizontal parts having a stripe shape and a vertical part disposed between the horizontal parts and connecting the horizontal parts.

3. The array substrate of claim 2, wherein the vertical part connects end portions of the horizontal parts.

4. The array substrate of claim 3, wherein the vertical part is arranged in a straight line.

5. The array substrate of claim 3, wherein the vertical part shifts back and forth from left to right.

6. The array substrate of claim 2, wherein the vertical part crosses the horizontal parts and connects adjacent horizontal parts.

7. The array substrate of claim 6, wherein the vertical part is arranged in a straight line.

8. The array substrate of claim 6, wherein the vertical part shifts back and forth from left to right.

9. The array substrate of claim 1, wherein the common line and the gate line are arranged on substantially the same layer.

10. The array substrate of claim 1, wherein the thin film transistor comprises:
    a gate electrode;
    an activation layer disposed on the gate electrode and insulated from the gate electrode; and
    a source electrode and a drain electrode spaced apart from each other on the activation layer.

11. The array substrate of claim 1, wherein the gate line and the data line comprise at least one metal or alloy of metal selected from the group consisting of molybdenum (Mo), niobium (Nb), copper (Cu), aluminum (Al), chrome (Cr), silver (Ag), and tungsten (W).

12. The array substrate of claim 1, wherein the common line comprises at least one metal or alloy of metal selected from the group consisting of molybdenum (Mo), niobium (Nb), copper (Cu), aluminum (Al), chrome (Cr), silver (Ag), and tungsten (W).

13. The array substrate of claim 1, wherein the common electrode and the pixel electrode comprise a transparent conductive material.

14. The array substrate of claim 13, wherein the transparent conductive material comprises at least one material selected from the group consisting of indium tin oxide (ITO), tin oxide (TO), indium zinc oxide (IZO), and indium tin zinc oxide (ITZO).

15. A method of manufacturing an array substrate of a liquid crystal display device, comprising:
    forming a common electrode at each of a plurality of pixel areas of an insulation substrate;
    forming a first metallic pattern comprising a gate line, a gate electrode extended in a first direction, and a common line, the common line connected to the common electrode and comprising a portion extended along a lateral gap between the common electrodes adjacent to each other in the first direction when viewed perpendicular to the insulation substrate;
    forming a gate insulation layer on the first metallic pattern;
    forming an activation layer on the gate insulation layer to overlap with the gate electrode;
    forming a second metallic pattern comprising a data line overlapping with the common line and a source electrode and a drain electrode spaced apart from each other on the activation layer so that the extended portion of the common line covers the lateral gap between the common electrodes adjacent to each other in the first direction, and the data line, a first gap between the common electrode and the data line, and a second gap between the adjacent common electrodes and the data line are completely overlapped by the extended portion of the common line in the first direction;
    forming a protective layer on the second metallic pattern; and
    forming a pixel electrode on the protective layer.

16. The method of claim 15, wherein the common electrode has as a plate shape, and
    the pixel electrode comprises horizontal parts having stripe shapes and a vertical part disposed between adjacent horizontal parts to connect to the adjacent horizontal parts.

17. The method of claim 16, wherein the vertical part connects end portions of the horizontal parts, and
    wherein the vertical part is arranged in a straight line.

18. The method of claim 16, wherein the vertical part connects end portions of the horizontal parts, and
    wherein the vertical part shifts back and forth from left to right.

19. The method of claim 16, wherein the vertical parts cross the horizontal parts and connect adjacent horizontal parts, and
    wherein the vertical part is arranged in a straight line.

20. The method of claim 16, wherein the vertical parts cross the horizontal parts and connect adjacent horizontal parts, and
    wherein the vertical part shifts back and forth from left to right.

21. The array substrate of claim 1, wherein the pixel area is defined by the gate line and the data line, and
    the common electrode is spaced apart from an adjacent common electrode disposed on an adjacent pixel area.

22. The array substrate of claim 3, wherein two horizontal parts adjacent to each other with the vertical part interposed therebetween, are parallel to each other.

23. The array substrate of claim 22, wherein other end portions of the horizontal parts are overlapped with the common line when viewed perpendicular to the insulation substrate from above.

24. The array substrate of claim 23, wherein the other end portions of the horizontal parts are separated from each other.

25. An array substrate of a liquid crystal display device, comprising:
    an insulation substrate;
    a gate line;
    a data line;
    a thin film transistor connected to the gate line and the data line;
    a common electrode disposed at a pixel area;
    a common line connected to the common electrode; and
    a pixel electrode overlapping with the common electrode,
    wherein the pixel electrode comprises first and second horizontal parts having a stripe shape and a vertical part disposed to cross between the first horizontal parts and second horizontal parts and connecting the first and second horizontal parts, the first horizontal parts and the second horizontal parts are separated from each other and disposed on same straight line, the first horizontal parts comprise upper first horizontal parts extending in a first direction from the vertical part and lower first horizontal parts extending in a second direction from the vertical part, and the second horizontal parts comprise upper second horizontal parts arranged opposite the upper first horizontal parts and extending in a direction opposite to the first direction and lower second horizontal parts arranged opposite the lower first horizontal parts and extending in a direction opposite to the second direction.

26. The array substrate of claim 25, wherein the gate line extends in a third direction, wherein the first direction and the second direction are not parallel with the third direction.

27. The array substrate of claim 25, wherein an upper first horizontal part and a lower first horizontal part are integrally formed at a central portion of the pixel electrode.

28. An array substrate of a liquid crystal display device comprising:
    a plurality of pixel areas;
    an insulation substrate;
    a gate line extended in a first direction;
    a data line;
    a thin film transistor connected to the gate line and the data line;
    a common electrode disposed at each of the plurality of pixel areas;
    a pixel electrode overlapping with the common electrode; and
    a common line connected to the common electrode and comprising a portion extended along a lateral gap between common electrodes adjacent to each other in the first direction when viewed perpendicular to the insulation substrate from above and covering the lateral gap between the common electrodes adjacent to each other in the first direction,
    wherein the extended portion of the common line completely overlaps with the data line and a gap between each common electrode and the data line in the first direction when viewed perpendicular to the insulation substrate from above, wherein the pixel electrode comprises first and second horizontal parts having a stripe shape and a vertical part disposed to cross between the first horizontal parts and second horizontal parts and connecting the first and second horizontal parts, the first horizontal parts and the second horizontal parts are separated each other and disposed on same straight line, the first horizontal parts comprise upper first horizontal parts extend in a first direction from the vertical part and lower first horizontal parts extend in a second direction from the vertical part, and the second horizontal parts comprise upper second horizontal parts extend in the first direction and lower second horizontal parts extend in the second direction, and wherein a length of the upper first horizontal part and a length of the upper second horizontal part are different from each other in the first direction and a length of the lower first horizontal part and a length of the lower second horizontal part are different from each other in the second direction.

* * * * *

UNITED STATES PATENT AND TRADEMARK OFFICE
CERTIFICATE OF CORRECTION

| | |
|---|---|
| PATENT NO. | : 8,497,965 B2 |
| APPLICATION NO. | : 12/249827 |
| DATED | : July 30, 2013 |
| INVENTOR(S) | : Cho |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this
Twenty-seventh Day of January, 2015

Michelle K. Lee
*Deputy Director of the United States Patent and Trademark Office*